United States Patent
Mazina et al.

(10) Patent No.: US 10,339,053 B2
(45) Date of Patent: Jul. 2, 2019

(54) VARIABLE CACHE FLUSHING

(71) Applicant: HEWLETT PACKARD ENTERPRISE DEVELOPMENT LP, Houston, TX (US)

(72) Inventors: Daniel J. Mazina, Houston, TX (US); Matt Gates, Houston, TX (US); David C. Burden, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 82 days.

(21) Appl. No.: 15/373,826

(22) Filed: Dec. 9, 2016

(65) Prior Publication Data

US 2018/0165020 A1   Jun. 14, 2018

(51) Int. Cl.
  *G06F 12/00*   (2006.01)
  *G06F 12/0808*   (2016.01)
  *G06F 12/0804*   (2016.01)
  *G06F 12/0868*   (2016.01)

(52) U.S. Cl.
  CPC ...... *G06F 12/0808* (2013.01); *G06F 12/0804* (2013.01); *G06F 12/0868* (2013.01); *G06F 2212/1016* (2013.01); *G06F 2212/262* (2013.01)

(58) Field of Classification Search
  None
  See application file for complete search history.

(56) References Cited

U.S. PATENT DOCUMENTS

| | | | |
|---|---|---|---|
| 6,738,923 B1 | 5/2004 | Blam et al. | |
| 7,062,675 B1* | 6/2006 | Kemeny | G06F 11/1441 |
| | | | 711/135 |
| 7,272,689 B2 | 9/2007 | Anderson | |
| 8,103,822 B2 | 1/2012 | Mosek et al. | |
| 8,429,348 B2 | 4/2013 | Factor et al. | |
| 8,812,612 B1 | 8/2014 | Laier et al. | |
| 2007/0256081 A1 | 11/2007 | Comer | |
| 2014/0358858 A1 | 12/2014 | Camble et al. | |
| 2015/0268711 A1 | 9/2015 | Ramani et al. | |

OTHER PUBLICATIONS intervalzero.com, "Delaying Cache Flushing," 1 page, retrieved oniine May 4, 2016 at https://www.intervalzero.com/library/RTX/WebHelp/Content/PROJECTS/Utilities/Delaying_Cache_Flushing.htm.

* cited by examiner

*Primary Examiner* — Yong J Choe
(74) *Attorney, Agent, or Firm* — Hewlett Packard Enterprise Patent Department

(57) ABSTRACT

Examples disclosed herein relate to variable cache flushing. Some examples disclosed herein a storage controller may detect a cache flush failure and, in response, may execute a first reattempt of the cache flush after a first time period has elapsed. The storage controller may adjust durations of time periods between subsequent reattempts of the cache flush based on various factors.

20 Claims, 4 Drawing Sheets

VARIABLE CACHE FLUSHING

BACKGROUND

A cache memory may store electronic information read from, or that is to be written to, a backing medium. Cache memories may have faster access times compared to the backing medium, and thus may be used as temporary storage to enhance performance of the backing medium.

BRIEF DESCRIPTION OF THE DRAWINGS

The following detailed description references the drawings, wherein.

DETAILED DESCRIPTION

Figure 1:
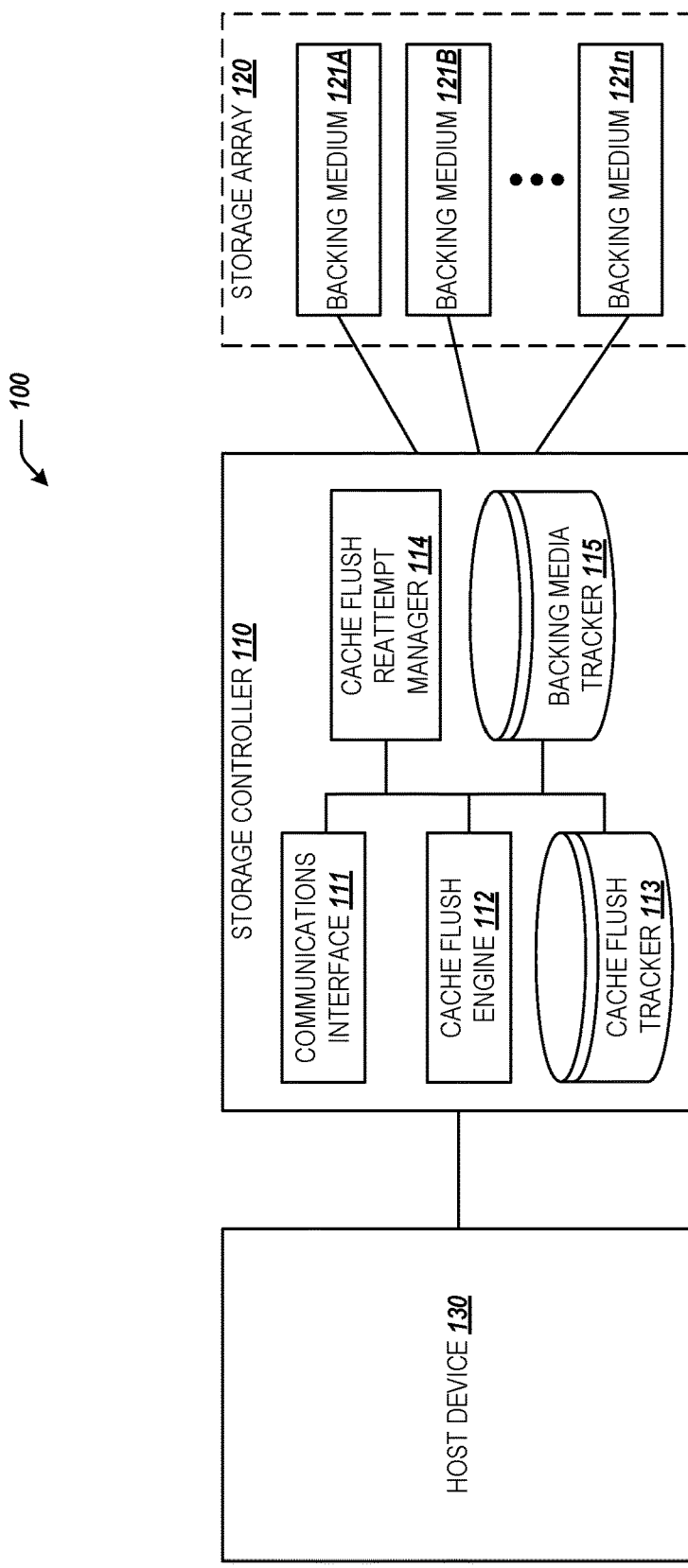
FIG. 1 is a block diagram of an example system for variable cache flushing.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

In order to write electronic information stored in a cache memory to a backing medium such as a storage disk, a storage controller may initiate a cache flush. A cache flush may be an operation by which cache lines of electronic information stored in a cache are written to a backing medium. The storage controller may identify cache lines that include the targeted electronic information (e.g., targeted by a host device), and may flush (i.e., write) those identified cache lines to the backing medium. In some implementations, such as when the backing medium is included in a redundant array of independent disks (RAID) array that is represented as a logical volume to the host device, the storage controller (a RAID controller in this instance) may calculate additional parity data to be written to the backing medium in the logical volume corresponding to the written data.

Cache flushes may not always complete successfully. For example, a storage controller may attempt to write cache lines from a cache to a backing medium as part of a cache flush, but the operation may fail if the backing medium is suffering from degraded performance.

Examples disclosed herein provide technical solutions to these technical challenges by providing systems, methods, and computer-readable media for variable cache flushing. Some examples disclosed herein may enable storage controllers to more efficiently reattempt failed cache flushes while minimizing impact to competing backing media access requests. A storage controller may initially try a reattempt of the failed cache flush after a first time duration has elapsed. If the initial reattempt also fails, the storage controller may variably delay subsequent reattempts to execute the cache flush based on various external factors, such as the host device's usage of the backing media as well as the performance of the backing media. By taking host device usage of backing media and the performance of the backing media, cache flush reattempts may be less likely to incur unacceptable latency, which in turn may reduce the number of reattempts before a cache flush completes successfully. Moreover, by reducing cache latency, the cache system may be less likely to appear compromised to the host device, which may reduce the risk of system failures.

FIG. 1 is a block diagram of an example computing system 100 for variable cache flushing. Computing system 100 may be implemented by a single computing system or a plurality of computing systems communicatively coupled via a network and/or communications interfaces. A computing system, as used herein, may be any type of computing system including, but not being limited to: a laptop, a desktop, an all-in-one device, a thin client, a workstation, a tablet computer, a mobile device, a network-enabled appliance (e.g., a "Smart" television), an Internet of Things (IoT) sensor, a server device, and a storage device.

As shown in FIG. 1, computing system 100 may include various components such as a storage controller 110, a storage array 120 including a plurality of backing media 121A-121n, and a host device 130. The number and arrangement of these components is an example only and provided for purposes of illustration. Other arrangements and numbers of components may be utilized without departing from the examples of the present disclosure.

Backing media 121A-121n may be any type of backing media, including for example, memory devices and storage drives (such as hard disk drives (HDDs) solid state drives (SSDs), solid-state hybrid drives (SSHDs), etc.). Storage array 120 may be implemented by various types of storage arrays, such as network-attached storage (NAS) arrays, storage area network (NAS) arrays, or virtualized storage arrays such as RAID arrays. In examples where storage array 120 is implemented as a RAID array, storage array 120 may be represented to host device 130 (and other components in computing system 100) as a logical storage volume. That is, while storage array 120 may include a plurality of backing media 121A-121n, host device 130 may see storage array 120 as a single storage volume comprised of physical backing media 121A-121n.

Host device 130 may communicate with storage controller 110. In some examples, host device 130 may provide I/O requests to storage controller 110. An I/O request, as used herein, may refer to read requests and/or write requests. When storage array 120 is implemented as a RAID array, the I/O requests may be directed to the logical volume comprising backing media 121A-121n. The I/O requests may include requests to read electronic information from backing media 121A-121n and requests to write electronic information to backing media 121A-121n. Host device 130 may receive electronic information in response to the I/O request and, in some implementations, confirmations that I/O requests were completed successfully. In some examples, host device 130 may be implemented as a standalone computing system or computing systems. While FIG. 1 shows a single host device 130 in communication with storage controller 110, other example implementations may include a plurality of host devices.

Storage controller 110 may manage access to, and the operation of, backing media 121A-121n of storage array 120. Storage controller 110 may be implemented by a computing system that includes a processor, such as a central processing unit (CPU), a dedicated integrated circuit such as an ASIC (application-specific integrated circuit), or a dedicated FPGA (field-programmable gate array). The processor may be a single processor or a plurality of processors. The processor may be capable of executing instructions (e.g., stored on a machine-readable storage medium of storage controller 110) that, when executed (e.g., by the processor of system controller 110), offer the functionality of storage controller 110 described herein. In some examples, storage controller 110 may be implemented as a combination of electronic circuitry (i.e., hardware) and software/firmware included in computing system 100 that implements the functionality of storage controller 110. In examples where storage array 120 is a RAID array, storage controller 110 may be implemented as a RAID controller.

Storage controller 110 may include a communications interface (I/F) 111, cache flush engine 112, cache flush tracker 113, cache flush reattempt manager 114, and a backing media tracker 115. Communications I/F 111, cache flush engine 112, and cache flush reattempt manager 114 may be implemented as hardware, software, or some combination of hardware and software/firmware as described above regarding storage controller 110 generally. For example, communications I/F 111, cache flush engine 112, and cache flush reattempt manager 114 may be implemented by a combination of hardware and programming that performs a designated function. For example, the hardware of each of communications I/F 111, cache flush engine 112, and cache flush reattempt manager 114 may include a processor or both a processor and a machine-readable storage medium that stores instructions or code executable by the processor to perform the designated function.

Cache flush tracker 113 and backing media tracker 115 may be stored in a database or across a plurality of databases. The database(s) may be included in storage controller 110 (as shown) and/or other locations of computing system 100. The database(s) may be implemented by logically and/or physically separate databases capable of storing data and may be accessed using methods such as data entry, data transfer, data uploading, etc.

Storage controller 110 may communicate with host device 130 and backing media 121A-121n via communications interface 111. Communications interface 111 may be implemented as a communications bus (e.g., USB, IEEE 1394, DisplayPort, DVI, HDMI, VGA, Serial port, PCI, PCI-E, SATA, I²C, SCSI, optical communications port, etc.), a wired or wireless networking interface (e.g., Ethernet, Wi-Fi, Bluetooth, Near Field Communication, etc.), a cellular communications interface, a Public Switched Telephone Network interface, or any other type of communications interface.

To manage access to backing media 121A-121n, storage controller 110 may communicate with host device 130 to receive I/O requests and provide electronic information and confirmations in response to the received I/O requests. Storage controller 110 may also communicate with backing media 121A-121n of storage array 120 to complete the received I/O requests. To complete an I/O read request when storage array 120 implemented as a RAID array, storage controller 110 may decompose the I/O read request to the logical volume of storage array 120 into individual queries to backing media 121A-121n (e.g., disk I/O requests). For example, storage controller 110 may analyze the I/O read request to identify the backing media among backing media 121A-121n corresponding to the received I/O request (i.e., backing media storing electronic information corresponding to the I/O read request), generate individual drive I/O requests to request the electronic information from the identified backing media, and provide the electronic information received from the identified backing media to host device 130. To complete an I/O write request received from host device 130, storage controller 110 may analyze the I/O write request to the logical volume of storage array 120 to identify the backing media among backing media 121A-121n to which electronic information corresponding to the I/O write request is to be written, provide drive I/O requests to the identified backing media to write the electronic information to the identified backing media, and, in some implementations, provide a confirmation to host device 130 upon completion.

In some implementations, storage controller 110 may temporarily store electronic information in a cache memory or disk buffer (not shown) prior to writing electronic information to backing media 121A-121n and prior to providing electronic information read from backing media 121A-121n to host device 130. Storage controller 110 may read and write electronic information from and to the cache in fixed-sized blocks called cache lines. The cache memory may be implemented by memory technologies with fast access times and may be used to speed up access times, lower latency, and increase bandwidth of backing media 121A-121n.

In some implementations, cache flush engine 112 of storage controller 110 may flush cache lines stored in a cache to a backing medium, such as a backing medium among backing media 121A-121n. A cache flush may be performed, for example, in response to instructions (e.g., from host device 130) to flush cache lines from the cache, in response to a cache flushing policy (e.g., a policy instituting a cache flushing schedule), and/or to make room in the cache for incoming electronic information to be written to the cache. To perform the cache flush, cache flush engine 112 may read cache lines stored in the cache, identify locations on backing media 121A-121n to which the cache lines are to be written, and write the cache lines to the identified locations.

Cache flush engine 112 may track cache flushes using cache flush tracker 113. Cache flush tracker 113 may identify the status of each cache flush, such as whether the cache flush is pending, in process, completed, failed, or being reattempted. Cache flush tracker 113 may also identify the quantity of attempts cache flush engine 112 has made for each cache flush. Cache flush engine 112 may continuously or periodically update cache flush tracker 113 with the status of each cache flush. For example, cache flush engine 112 may determine that a cache flush has completed successfully or failed to complete successfully and update cache flush tracker 113 accordingly.

Cache flush engine 112 may determine that the cache flush attempt has failed or completed successfully based on various indicators. For example, cache flush engine 112 may determine that a cache flush has failed in response to cache flush engine 112 failing to receive a response to an I/O request (e.g., a request to write cache lines) from a backing medium within a threshold response time (e.g., 500 milliseconds, 3 seconds, etc.). As another example, cache flush engine 112 may determine that a cache flush has failed in response to cache flush engine 112 receiving a notification from the backing medium of a failure in writing cache lines to the backing medium.

In scenarios where a cache flush fails (that is, where cache flush engine 112 does not complete a cache flush successfully), cache flush engine 112 may reattempt the failed cache flush. However, the reattempted cache flush may have to compete for access to the backing medium to which cache lines associated with the cache flush are to be written. For example, host device 130 (and/or other devices) may be accessing (e.g., reading and/or writing electronic information) the backing medium at the time cache flush engine 112 may reattempt the failed cache flush. Reattempting the cache flush while usage of the backing medium is high may result in increased delay (or latency) to I/O requests directed to the backing medium as well as increased delay to the reattempted cache flush. The increase in I/O request and cache flush latency may compromise the performance of storage controller 110. Host device 130 may sense that the performance of storage controller 110 has been compromised (e.g., the time duration for storage controller 110 to complete I/O requests has exceeded a threshold time duration) and may therefore mark storage controller 110 as failed, which may result in system failure of computing system 100.

To prevent system failure of computing system 100, and to ensure that I/O requests and cache flushes are completed in a timely fashion, cache flush reattempt manager 114 of system controller 110 may use various factors to variably schedule reattempts of failed cache flushes by cache flush engine 112 to ensure efficient scheduling of access to backing media 121A-121n. The factors used by cache flush reattempt manager 114 may include, for example, the workload on backing media 121A-121n, the performance of backing media 121A-121n, the type of backing media 121A-121n to which cache lines are to be written, as well as the quantity of previously failed cache flush attempts by cache flush engine 112. The factors may be considered alone or in combination. When considered in combination, cache flush reattempt manager 114 may weight, prioritize, or consider the factors algorithmically.

In some implementations, initial (or first) reattempts of cache flushes may be executed by cache flush engine 112 after a first time period has elapsed. The first time period may be a global fixed time period for all first reattempts of failed cache flushes to backing media 121A-121n. The first time period duration may be determined and set by cache flush reattempt manager 114 based on various factors, including, for example, host device 130 policy and/or a type of backing medium to which cache lines corresponding to a cache flush are to be written. If a cache flush continues to fail after the first reattempt, the durations of time periods between subsequent reattempts of the failed cache flush may be adjusted cache flush reattempt manager 114.

Cache flush reattempt manager 114 may obtain the quantity of previous failed cache flush attempts by cache flush engine 112 from cache flush tracker 113. The failure quantity may be defined as the quantity of previous failed attempts and reattempts for each cache flush that has not yet completed successfully. Cache flush reattempt manager 114 may adjust durations of time periods between subsequent reattempts (i.e., reattempts subsequent to the first reattempt) of a failed cache flush based on the quantity of previous failed attempts of the failed cache flush. For example, cache flush reattempt manager 114 may increase the durations of time periods between subsequent reattempts of the failed cache flush as the quantity of previous failed attempts of the cache flush increases. In some implementations the increase in the durations of time periods may be linear. For example, the time duration between subsequent reattempts may be increased 5 seconds each time the quantity of failed attempts increases. Thus, in the example, the duration between the second and third reattempt may be 5 seconds, the duration between the third and fourth reattempt may be 10 seconds, the duration between the fourth and fifth reattempt may be 15 seconds, etc. In some implementations the increase in the durations of time periods may be nonlinear. For example, increases in the time duration between subsequent reattempts may be increased 5 seconds each time the quantity of failed attempts increases. Thus, in the example, the duration between the second and third reattempt may be 5 seconds, the duration between the third and fourth reattempt may be 10 seconds (5 second increase), the duration between the fourth and fifth reattempt may be 15 seconds (10 second increase), the duration between the fifth and sixth reattempt may be 30 seconds (15 second increase), etc.

Backing media tracker 115 may track various parameters associated with the workload and performance of each of backing media 121A-121n. Cache flush reattempt manager 114 may reference the parameters of backing media 121A-121n in backing media tracker 115 to adjust durations of time periods between subsequent reattempts of failed cache flushes to backing media 121A-121n.

The parameters associated with the workload on backing media 121A-121n may include the rate of I/O requests directed to each of backing media 121A-121n. The rate of I/O requests may include the rate of read requests, the rate of write requests, and a combination thereof. Cache flush reattempt manager 114 may (linearly and/or non-linearly) adjust the durations of time periods between subsequent reattempts (i.e., reattempts subsequent to the first reattempt) of failed cache flushes based on changes in the rate of I/O requests directed to backing medium among backing media 121A-121n to which cache lines corresponding to a cache flush are to be written. For example, cache flush reattempt manager 114 may reference the I/O request rate of a backing medium in backing media tracker 115 and determine that the rate of I/O requests for that backing medium is increasing. Accordingly, in the example, cache flush reattempt manager 114 may increase the durations of time periods between subsequent reattempts of the failed cache flush in response to the increase. As another example, cache flush reattempt manager 114 may reference the I/O request rate of a backing medium in backing media tracker 115 and determine that the rate of I/O requests for that backing medium is decreasing. Accordingly, in the example, cache flush reattempt manager 114 may decrease the durations of time periods between subsequent reattempts of the failed cache flush in response to the decrease. Thus, cache flush reattempt manager 114 can adjust durations of time periods between subsequent reattempts such that reattempts are executed quicker when backing medium utilization is low and are executed less frequently when backing medium resources are being heavily utilized.

The parameters associated with the performance of backing media 121A-121n may include the rate of I/O errors for each of backing media 121A-121n. The I/O error rate for a backing medium may be defined as the quantity of I/O errors (e.g., read errors and write errors) a backing medium experiences while completing reads and/or writes. Cache flush reattempt manager 114 may (linearly and/or non-linearly) adjust the durations of time periods between subsequent reattempts (i.e., reattempts subsequent to the first reattempt) of failed cache flushes based on changes in the rate of I/O errors for a backing medium among backing media 121A-121n to which cache lines corresponding to a cache flush are to be written. For example, cache flush reattempt manager 114 may reference the I/O error rate of a backing medium in backing media tracker 115 and determine that the rate of I/O errors for that backing medium is increasing. Accordingly, in the example, cache flush reattempt manager 114 may increase the durations of time periods between subsequent reattempts of the failed cache flush in response to the increase. As another example, cache flush reattempt manager 114 may reference the I/O error rate of a backing medium in backing media tracker 115 and determine that the rate of I/O errors for that backing medium is decreasing. Accordingly, in the example, cache flush reattempt manager 114 may decrease the durations of time periods between subsequent reattempts of the failed cache flush in response to the decrease. Thus, cache flush reattempt manager 114 can adjust durations of time periods between subsequent reattempts such that reattempts are executed less frequently when a backing medium appears to be suffering from decreasing performance and are executed more frequently in response to a backing medium showing signs that the health of the backing medium is improving.

Figure 2:
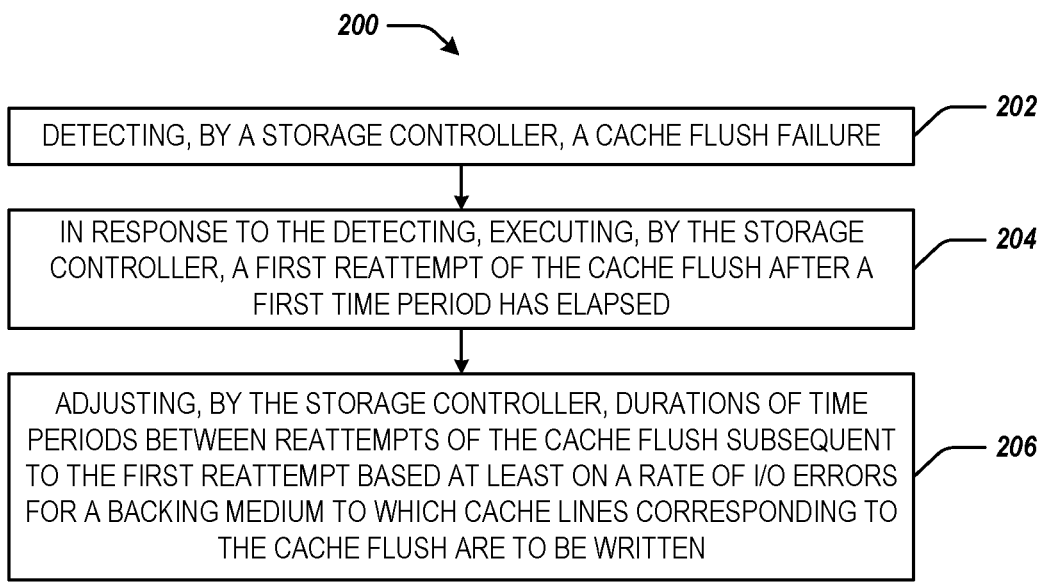
FIG. 2 is a flowchart of an example method for variable cache flushing.

FIG. 2 is a flowchart depicting an example method 200 for variable cache flushing. Method 200 may be executed or performed, for example, by some or all of the system components described above in computing system 100 of FIG. 1. Other suitable computing systems may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In some examples, steps of method 200 may be executed substantially concurrently or in a different order than shown in FIG. 2. In some examples, method 200 may include more or less steps than are shown in FIG. 2. In some examples, some of the steps of method 200 may, at certain times, be ongoing and/or may repeat.

At block 202, method 200 may include detecting, by a storage controller, a cache flush failure. Referring back to FIG. 1, cache flush reattempt manager 114 of storage controller 110 may be responsible for implementing block 202.

At block 204, method 200 may include executing, by the storage controller, a first reattempt of the cache flush after a first time period has elapsed in response to the detecting at 202. Referring back to FIG. 1, cache flush engine 112 of storage controller 110 may be responsible for implementing block 204. In some implementations, the duration of the first time period may be determined based on a type of backing medium to which cache lines corresponding to the cache flush are to be written.

At block 206, method 200 may include adjusting, by the storage controller, durations of time periods between reattempts of the cache flush subsequent to the first reattempt. Referring back to FIG. 1, cache flush reattempt manager 114 of storage controller 110 may be responsible for implementing block 206. In some implementations, adjusting the durations of time periods between reattempts of the cache flush subsequent to the first reattempt may be based at least on a quantity of previous failed attempts of the cache flush. For example, the storage controller may increase the durations of time periods between reattempts of the cache flush subsequent to the first reattempt as the quantity of previous failed attempts of the cache flush increases.

Figure 3:
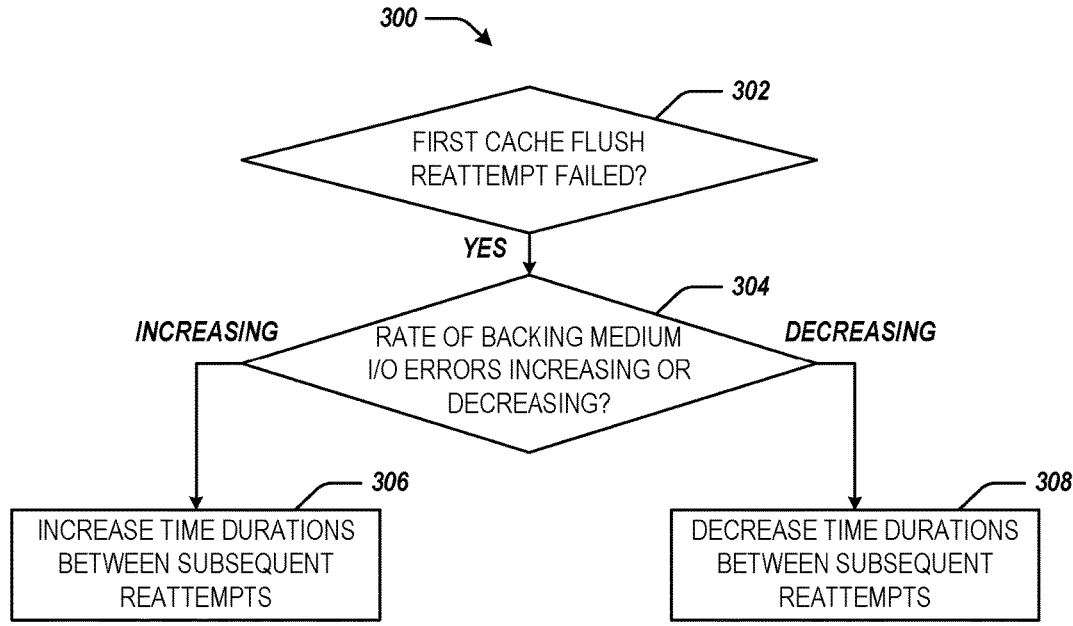
FIG. 3 is a flowchart of an example method for variable cache flushing.

FIG. 3 is a flowchart depicting an example method 300 for variable cache flushing. Method 300 may be executed or performed, for example, by some or all of the system components described above in computing system 100 of FIG. 1. Other suitable computing systems may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat. In some examples, method 300 may be performed as part of method 200 of FIG. 2.

At block 302, method 300 may include detecting that a first cache flush reattempt has failed. Referring back to FIG. 1, cache flush reattempt manager 114 of storage controller 110 may be responsible for implementing block 302.

At block 304, method 300 may include determining a rate of I/O errors for a backing medium to which cache lines corresponding to the cache flush are to be written and adjusting the durations of time periods between reattempts of the cache flush subsequent to the first reattempt based at least on the rate of I/O errors. Referring back to FIG. 1, cache flush reattempt manager 114 of storage controller 110 may be responsible for implementing block 304.

At block 306, method 300 may include increasing the durations of time periods between reattempts of the cache flush subsequent to the first reattempt in response to an increase in the rate of I/O errors for the backing medium (304—Increasing). Referring back to FIG. 1, cache flush reattempt manager 114 of storage controller 110 may be responsible for implementing block 306.

At block 308, method 300 may include decreasing the durations of time periods between reattempts of the cache flush subsequent to the first reattempt in response to a decrease in the rate of I/O errors for the backing medium (304—Decreasing). Referring back to FIG. 1, cache flush reattempt manager 114 of storage controller 110 may be responsible for implementing block 308.

Figure 4:
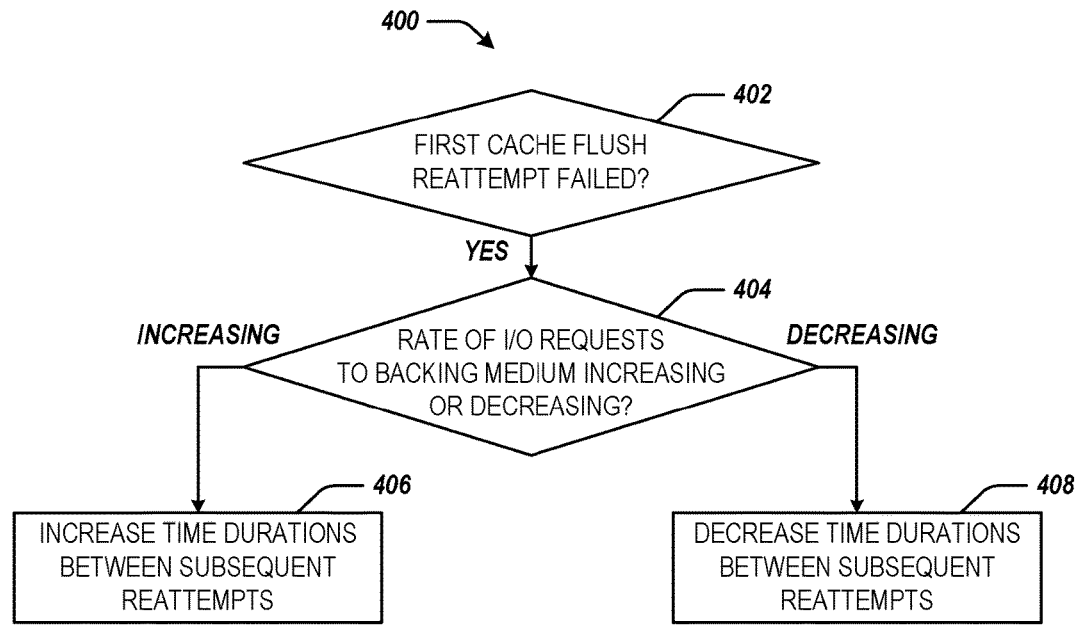
FIG. 4 is a flowchart of an example method for variable cache flushing.

FIG. 4 is a flowchart depicting an example method 400 for variable cache flushing. Method 400 may be executed or performed, for example, by some or all of the system components described above in computing system 100 of FIG. 1. Other suitable computing systems may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat. In some examples, method 400 may be performed as part of method 200 of FIG. 2.

At block 402, method 400 may include detecting that a first cache flush reattempt has failed. Referring back to FIG. 1, cache flush reattempt manager 114 of storage controller 110 may be responsible for implementing block 402.

At block 404, method 400 may include determining a rate of I/O requests directed to a backing medium to which cache lines corresponding to the cache flush are to be written and adjusting the durations of time periods between reattempts of the cache flush subsequent to the first reattempt based at least on the rate of I/O requests. Referring back to FIG. 1, cache flush reattempt manager 114 of storage controller 110 may be responsible for implementing block 404.

At block 406, method 400 may include increasing the durations of time periods between reattempts of the cache flush subsequent to the first reattempt in response to an increase in the rate of I/O requests for the backing medium (404—Increasing). Referring back to FIG. 1, cache flush reattempt manager 114 of storage controller 110 may be responsible for implementing block 406.

At block 408, method 400 may include decreasing the durations of time periods between reattempts of the cache flush subsequent to the first reattempt in response to a decrease in the rate of I/O requests for the backing medium (404—Decreasing). Referring back to FIG. 1, cache flush reattempt manager 114 of storage controller 110 may be responsible for implementing block 408.

Figure 5:
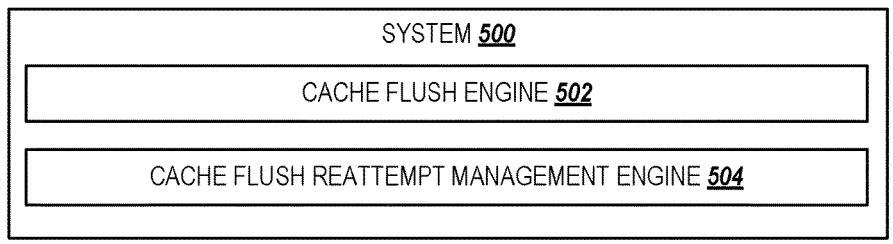
FIG. 5 is a block diagram of an example system for variable cache flushing.

FIG. 5 is a block diagram depicting an example system 500 for variable cache flushing. System 500 may include a cache flush engine 502 and a cache flush reattempt management engine 504. In some examples, system 500 may be implemented by storage controller 110 of FIG. 1.

The term "engine", as used herein in reference to components 502 and 504, refers to a combination of hardware and programming that performs a designated function. For example, the hardware of each engine may include a processor or both a processor and a machine-readable storage medium, while the programming may include instructions or code stored on the machine-readable storage medium and executable by the processor to perform the designated function.

Referring to FIG. 5, cache flush engine 502 may include a processor and program instructions that, when executed, cause the processor to attempt a cache flush by reading cache lines from a cache and writing the cache lines to a backing medium, in response to a failure of the cache flush attempt, execute a first reattempt of the cache flush after a first time period has elapsed, and in response to a failure of the first cache flush reattempt, execute a second reattempt of the cache flush after a second time period has elapsed. Cache flush reattempt management engine 504 may include a processor and program instructions that, when executed, cause the processor to adjust a duration of the second time period based at least on a rate of I/O requests directed to the backing medium.

In some implementations, the program instructions, when executed, cause the processor included in cache flush engine 502 to determine that the cache flush attempt has failed in response to cache flush engine 502 failing to receive a response to a request to write the cache lines to the backing medium within a threshold response time and, in response, execute the first reattempt of the cache flush after the first time period has elapsed. In some implementations, the program instructions, when executed, cause the processor included in cache flush engine 502 to determine that the cache flush attempt has failed in response to cache flush engine 502 receiving a notification from the backing medium of a failure in writing the cache lines to the backing medium and, in response, execute the first reattempt of the cache flush after the first time period has elapsed.

In some implementations, the program instructions, when executed, cause the processor included in flush reattempt management engine 504 to adjust a duration of the second time period based on a rate of I/O errors for the backing medium. For example, the processor may increase the duration of the second time period in response to an increase in the rate of I/O errors for the backing medium and/or decrease the duration of the second time period in response to a decrease in the rate of I/O errors for the backing medium.

In some implementations, the program instructions, when executed, cause the processor included in flush reattempt management engine 504 to adjust a duration of the second time period based on a rate of I/O requests directed to the backing medium. For example, the processor may increase the duration of the second time period in response to an increase in the rate of I/O requests directed to the backing medium and/or decrease the duration of the second time period in response to a decrease in the rate of I/O requests directed to the backing medium.

Figure 6:
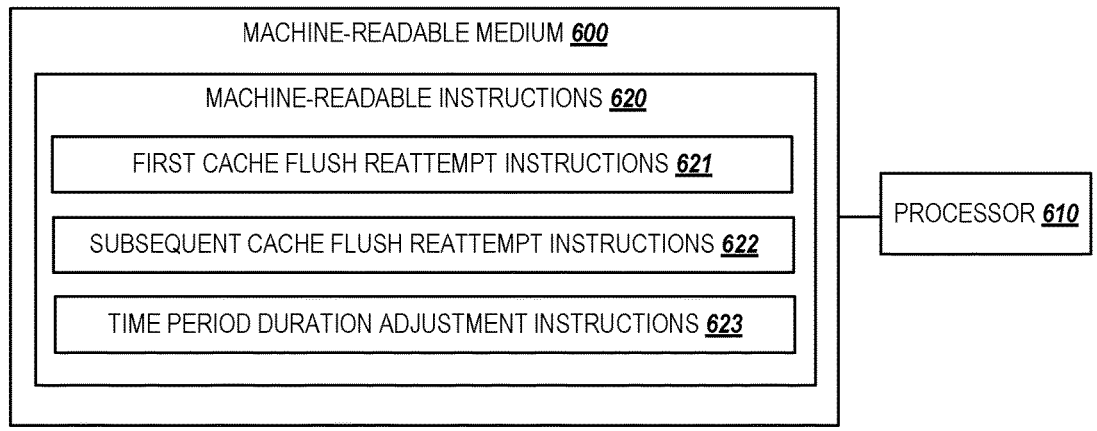
FIG. 6 is a block diagram of an example system for variable cache flushing.

FIG. 6 is a block diagram of an example machine-readable medium 600 for variable cache flushing. Machine-readable medium 600 may be communicatively coupled to a processor 610. Machine-readable medium 600 and processor 610 may, for example, be included as part of computing system 100 illustrated in FIG. 1. For example, machine-readable medium 600 and processor 610 may be included in storage controller 110. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 610 may be central processing units (CPUs), microprocessors, and/or other hardware devices suitable for retrieval and execution of instructions stored in machine-readable storage medium 600. In the example shown in FIG. 6, processor 610 may fetch, decode, and execute machine-readable instructions 620 (including instructions 621-623) for variable cache flushing. As an alternative or in addition to retrieving and executing instructions, processor 610 may include electronic circuits comprising a number of electronic components for performing the functionality of the instructions in machine-readable storage medium 600. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 600 may be any electronic, magnetic, optical, or other physical storage device that stores executable instructions. Thus, machine-readable storage medium 600 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Machine-readable storage medium 600 may be disposed within a computing system (e.g., computing system 100 of FIG. 1). In this situation, the executable instructions may be "installed" on the computing system. Alternatively, machine-readable storage medium 600 may be a portable, external or remote storage medium, for example, that allows a computing system to download the instructions from the portable/external/remote storage medium. In this situation, the executable instructions may be part of an "installation package". As described herein, machine-readable storage medium 600 may be encoded with executable instructions for variable cache flushing.

Referring to FIG. 6, first cache flush reattempt instructions 621, when executed by a processor (e.g., 610), may cause the processor to, in response to detecting a failed cache flush to a backing medium, execute a first reattempt of the cache flush after a first time period has elapsed. In some implantations, the backing medium may be a storage drive included in a storage array such as a RAID array. Subsequent cache flush reattempt instructions 622, when executed by a processor (e.g., 610), may cause the processor to, in response to detecting that the first reattempt failed, execute subsequent reattempts of the cache flush. Time period duration adjustment instructions 623, when executed by a processor (e.g., 610), may cause the processor to, adjust durations of time periods between the subsequent reattempts based at least on at least one of a rate of I/O errors for the backing medium, a rate of I/O requests directed to the backing medium, and a quantity of failed attempts for the cache flush. For example, time period duration adjustment instructions 623 may be executable to increase the durations of time periods between the subsequent reattempts in response to an increase in the rate of I/O errors for the backing medium, increase the durations of time periods between the subsequent reattempts in response to an increase in the rate of I/O requests directed to the backing medium, and/or increase the durations of time periods between the subsequent reattempts in response to an increase in the quantity of failed attempts for the cache flush. As another example, time period duration adjustment instructions 623 may be executable to decrease the durations of time periods between the subsequent reattempts in response to a decrease in the rate of I/O errors for the backing medium and/or decrease the durations of time periods between the subsequent reattempts in response to a decrease in the rate of I/O requests directed to the backing medium. Subsequent cache flush reattempt instructions 622, when executed by a processor (e.g., 610), may cause the processor to, execute the subsequent reattempts of the cache flush according to the time period duration adjustments made by time period duration adjustment instructions 623.

The foregoing disclosure describes a number of example implementations for variable cache flushing. The disclosed examples may include systems, devices, machine-readable storage media, and methods for variable cache flushing. For purposes of explanation, certain examples are described with reference to the components illustrated in FIGS. 1, 5, and 6. The functionality of the illustrated components may overlap, however, and may be present in a fewer or greater number of elements and components. Further, all or part of the functionality of illustrated elements may co-exist or be distributed among several geographically dispersed locations.

Moreover, the disclosed examples may be implemented in various environments and are not limited to the illustrated examples. Further, the sequence of operations described in connection with FIGS. 2-4 are examples and is not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for variable cache flushing, the method comprising:
   detecting, by a storage controller, a cache flush failure;
   in response to the detecting, executing, by the storage controller, a first reattempt of the cache flush after a first time period has elapsed; and
   adjusting, by the storage controller, durations of time periods between reattempts of the cache flush subsequent to the first reattempt based at least on a rate of input/output (I/O) errors for a backing medium to which cache lines corresponding to the cache flush are to be written.

2. The method of claim 1, wherein a duration of the first time period is determined based on a type of the backing medium to which cache lines corresponding to the cache flush are to be written.

3. The method of claim 2, wherein:
   the backing medium comprises a storage drive included in a storage array;
   the storage array comprises a redundant array of independent disks (RAID); and
   the storage controller comprises a RAID controller.

4. The method of claim 1, wherein adjusting the durations of time periods between reattempts of the cache flush subsequent to the first reattempt based on the rate of I/O errors for the backing medium comprises:
   increasing the durations of time periods between reattempts of the cache flush subsequent to the first reattempt in response to an increase in the rate of I/O errors for the backing medium.

5. The method of claim 1, comprising:
   adjusting the durations of time periods between reattempts of the cache flush subsequent to the first reattempt based at least on a rate of I/O requests directed to the backing medium to which cache lines corresponding to the cache flush are to be written.

6. The method of claim 5, wherein adjusting the durations of time periods between reattempts of the cache flush subsequent to the first reattempt based on the rate of I/O requests directed to the backing medium comprises:
   increasing the durations of time periods between reattempts of the cache flush subsequent to the first reattempt in response to an increase in the rate of I/O requests directed to the backing medium.

7. The method of claim 5, wherein adjusting the durations of time periods between reattempts of the cache flush subsequent to the first reattempt based on the rate of I/O requests directed to the backing medium comprises:
  decreasing the durations of time periods between reattempts of the cache flush subsequent to the first reattempt in response to a decrease in the rate of I/O requests directed the backing medium.

8. The method of claim 1, wherein adjusting the durations of time periods between reattempts of the cache flush subsequent to the first reattempt is based at least on the rate of I/O errors for the backing medium and a quantity of previous failed attempts of the cache flush.

9. The method of claim 8, wherein adjusting the durations of time periods between reattempts of the cache flush subsequent to the first reattempt based at least on the rate of I/O errors for the backing medium and the quantity of previous failed attempts of the cache flush comprises:
  increasing the durations of time periods between reattempts of the cache flush subsequent to the first reattempt as the quantity of previous failed attempts of the cache flush increases.

10. A system comprising:
  a processor; and
  a non-statutory storage medium storing instructions executable on the processor to:
    attempt a cache flush by reading cache lines from a cache and writing the cache lines to a backing medium;
    in response to a failure of the cache flush attempt, execute a first reattempt of the cache flush after a first time period has elapsed;
    in response to a failure of the first reattempt, execute a second reattempt of the cache flush after a second time period has elapsed; and
    adjust a duration of the second time period based at least on a rate of input/output (I/O) requests directed to the backing medium.

11. The system of claim 10, wherein the instructions are executable on the processor to:
  determine that the cache flush attempt has failed in response to failing to receive a response to a request to write the cache lines to the backing medium within a threshold response time; and
  in response to the determination, execute the first reattempt of the cache flush after the first time period has elapsed.

12. The system of claim 10, wherein the instructions are executable on the processor to:
  determine that the cache flush attempt has failed in response to receiving a notification of a failure in writing the cache lines to the backing medium; and
  in response to the determination, execute the first reattempt of the cache flush after the first time period has elapsed.

13. The system of claim 10, wherein the instructions are executable on the processor to adjust a duration of the second time period further based on a rate of I/O errors for the backing medium.

14. The system of claim 13, wherein the instructions are executable on the processor to:
  increase the duration of the second time period in response to an increase in the rate of I/O errors for the backing medium; and
  decrease the duration of the second time period in response to a decrease in the rate of I/O errors for the backing medium.

15. The system of claim 10, wherein the instructions are executable on the processor to:
  increase the duration of the second time period in response to an increase in the rate of I/O requests directed to the backing medium; and
  decrease the duration of the second time period in response to an decrease in the rate of I/O requests directed to the backing medium.

16. A non-transitory machine-readable storage medium comprising instructions executable by a processor of a storage controller for variable cache flushing, the instructions being executable to:
  in response to detecting a failed cache flush to a backing medium, execute a first reattempt of the cache flush after a first time period has elapsed;
  in response to detecting that the first reattempt failed, execute subsequent reattempts of the cache flush; and
  adjust durations of time periods between the subsequent reattempts based at least on a rate of input/output (I/O) errors for the backing medium, a rate of I/O requests directed to the backing medium, and a quantity of failed attempts for the cache flush.

17. The non-transitory machine-readable storage medium of claim 16, wherein the instructions are executable to:
  increase the durations of time periods between the subsequent reattempts in response to an increase in the rate of I/O errors for the backing medium;
  increase the durations of time periods between the subsequent reattempts in response to an increase in the rate of I/O requests directed to the backing medium; and
  increase the durations of time periods between the subsequent reattempts in response to an increase in the quantity of failed attempts for the cache flush.

18. The non-transitory machine-readable storage medium of claim 16, wherein the instructions are executable to:
  decrease the durations of time periods between the subsequent reattempts in response to a decrease in the rate of I/O errors for the backing medium; and
  decrease the durations of time periods between the subsequent reattempts in response to a decrease in the rate of I/O requests directed to the backing medium.

19. The non-transitory machine-readable storage medium of claim 16, wherein the backing medium comprises a storage drive included in a storage array.

20. The non-transitory machine-readable storage medium of claim 19, wherein the storage array comprises a redundant array of independent disks (RAID) array and the storage controller comprises a RAID controller.

* * * * *